July 21, 1959 P. A. VELTRI 2,895,716
ADJUSTABLE FENCE SECTION
Filed Jan. 2, 1957 2 Sheets-Sheet 1
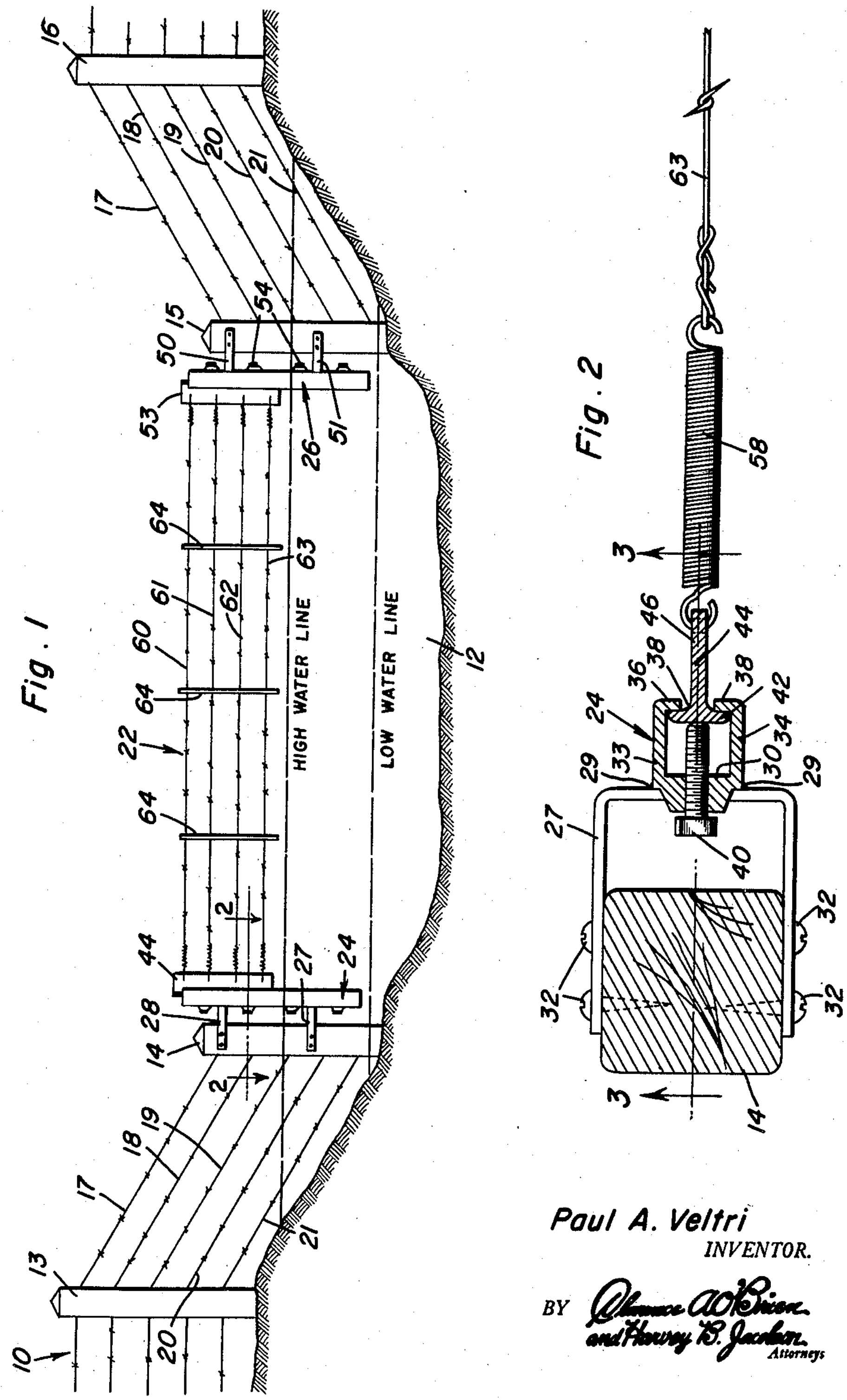
Paul A. Veltri
INVENTOR.
BY Clarence A. O'Brien
and Harvey B. Jacobson
Attorneys July 21, 1959 P. A. VELTRI 2,895,716
ADJUSTABLE FENCE SECTION
Filed Jan. 2, 1957 2 Sheets-Sheet 2
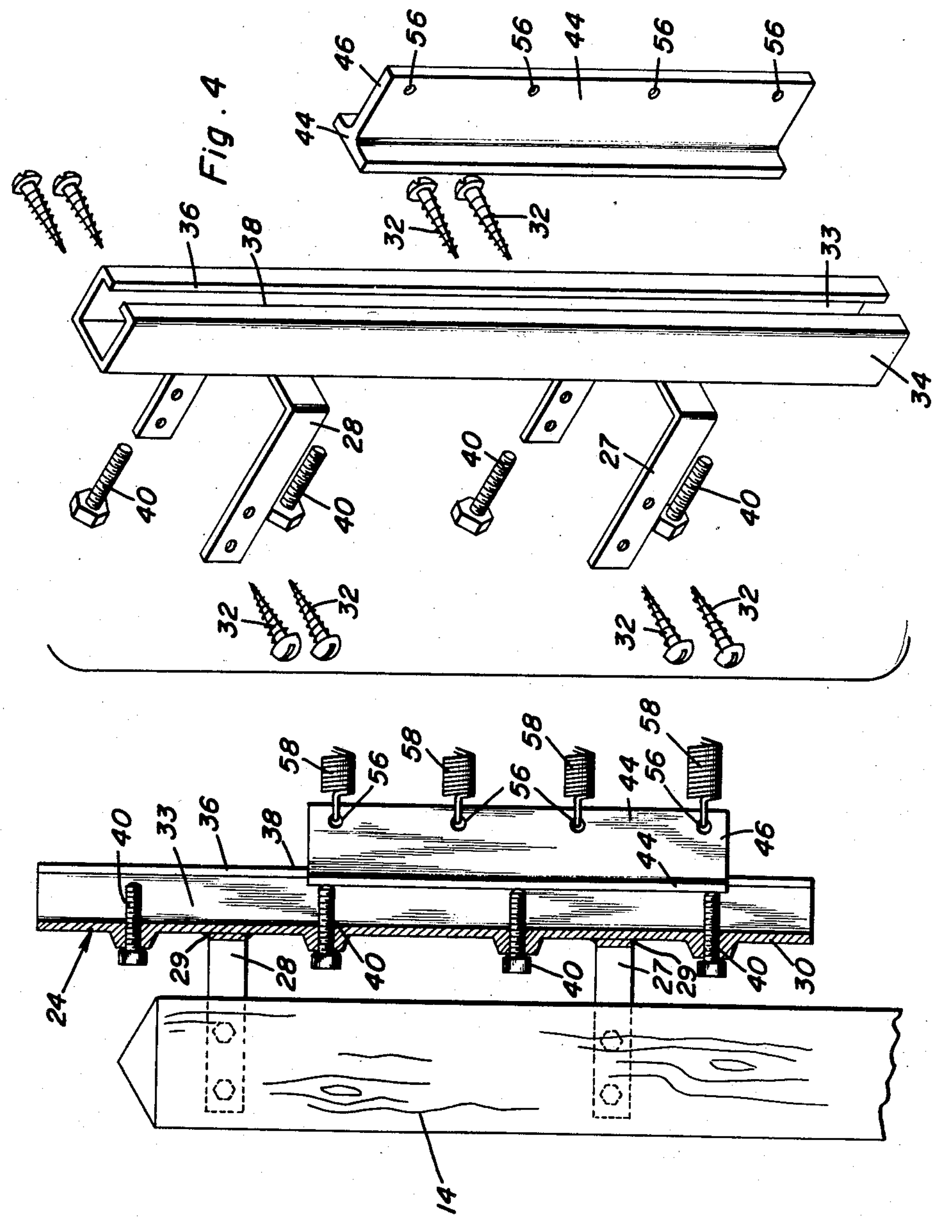
Paul A. Veltri
INVENTOR.
BY Clarence A. O'Brien
and Harvey B. Jacobson
Attorneys

United States Patent Office 2,895,716

Patented July 21, 1959

1

2,895,716

ADJUSTABLE FENCE SECTION

Paul A. Veltri, Crested Butte, Colo.

Application January 2, 1957, Serial No. 632,072

10 Claims. (Cl. 256—23)

This invention relates to a fence and more particularly to an adjustable fence section.

An object of the present invention is to provide an adjustable fence section which is to form a part of a fence and whereby troublesome and costly fence repairs due to the swelling of streams, creeks, rivers and the like and the litter carried thereby are eliminated. This is achieved by having the fence section capable of being easily and readily adjusted substantially vertically during the rainy season or when otherwise found necessary or desirable. During high water the fence elements, for example wires, may be raised and held taut while being elevated. In this way the section will not collect the usual amount of rubbish and debris. After the high water is passed, the fence elements are lowered by simple operation thereby preventing livestock from getting out from under the fence.

Accordingly, it is a further object of the invention to provide an easily adjustable fence section which enables one man to adjust the same without having the fence elements becoming loose and tangled and yet, being of such construction that it is sufficiently lightweight to enable the single farmer to do the job.

A further object of the invention is to provide a section in a fence which may be raised and lowered without danger of binding. In this way a selected angularity of the section may be obtained and held regardless of the angularity of the adjacent parts of the fence. Accordingly, if it is desired to retain one side of the fence section high temporarily while the other side is maintained at a low position, this may be easily achieved and this is something which is not easily done in adjustable fence sections which are framed as a gate.

Other objects and features of importance such as the practicability of the fence section and the ease of manipulation during adjustment, will become apparent in following the description of the illustrated form of the invention, wherein:

Figure 1 is a fragmentary elevational view of a fence which embodies an adjustable fence section to demonstrate the principles of the invention;

Figure 2 is an enlarged sectional view taken on the line 2—2 of Figure 1;

Figure 3 is a sectional view taken on the line 3—3 of Figure 2; and

Figure 4 is an exploded perspective view of one side of the section in Figure 1.

In the accompanying drawing there is a fence 10 which is fragmentarily illustrated as being mounted in the soil and across the creek 12. Creek 12 schematically represents any type of water body, for example a river, stream or even a dry gulch or the like which fills with water occassionally. Fence 10 is of the type which involves posts, for example posts 13, 14, 15, and 16 on which fence elements such as barbed wires 17, 18, 19, 20 and 21 are secured. Instead of having the barbed wires 17, 18, 19, 20 and 21 extending between posts 14 and 15 and thereby spanning the creek 12, an adjustable

2 fence section 22 extends across and is connected with posts 14 and 15. This section 22 spans the creek 12, extending from bank to bank thereof. For illustrative purposes a high water line and a low water line are shown. This being the case the posts 14 and 15 are driven into the ground at the edge of the water during the low water level. Then, the high water line will be somewhere between the top and bottom of the posts as illustrated. At the low water level the adjustable fence section 22 is the low position but at the high water level, the adjustable fence section 22 is elevated the necessary distance as shown in Figure 1.

Section 22 is made of a track which has two rails 24 and 26. U-shaped mounting brackets 27 and 28 are welded by welds 29 to the back cross member 30 of the rail 24 and they embrace post 14 to which they are attached, by means of screws 32 or some other standard fastener. This mounts the rail 24 in a vertical position with the sides 33 and 34 of the rail protruding inwardly and the inwardly directed flanges 36 and 37 at the extremities of the sides 33 and 34 defining the edges of a vertical passageway 38. A plurality of setscrews 40 are threaded in tapped openings in the cross member 30 of rail 24 and bear against the plate 42 of the support 44, the latter being vertically slidable in rail 24. Support 44 is of T-shape section with the plate 42 being held captive in the rail 24 and capable of vertical adjustment while the perpendicular part 46 of the support passes through passageway 38. Setscrews 40 bearing on the support 44 hold the support pressed firmly against the flanges 36 and 38, frictionally support 44 in adjusted position.

Rail 26 is constructed identically, having mounting brackets 50 and 51 secured thereto, the mounting brackets being fixed on the post 15 just as the mounting brackets 28 and 27 are fixed onto post 14. Vertically adjustable support 53 is held slidably captive in rail 26 by means of setscrews 54 which are similar in construction and function to the setscrews 40.

Each support 44 and 53 is formed with a group of apertures 56 which are preferably in a vertical row. There is a spring 58 in each aperture (Figure 3). Fence elements 60, 61, 62 and 63 respectively are secured at their ends to the springs on the opposing supports 44 and 53. Spacers consisting of one or more bars 64 having apertures therein, are located on the fence elements 60, 61, 62 and 63 by having the fence elements threaded therethrough. Depending on the type of fence, the nature of the fence elements 60, 61, 62 and 63 will be varied. For example if the remainder of the fence is barbed wire, the fence elements will be generally selected from the same type of barbed wire. However, this is not necessary in that the fence elements 60, 61, 62 and 63 may differ from the fence elements 17, 18, 19, 20 and 21.

In operation of the invention, fence 10 which typifies any type of fence compatible with the principles of the invention, is installed in the customary manner. Section 22 is constructed and arranged as described. Then, when it is necessary to elevate the section 22, as when the stream 12 becomes swollen, one man on one side of the stream 12 loosens the setscrews and simply slides the support 44 vertically upwardly. The springs 58 maintain the wires taut at all times and allow the necessary flexibility between the rails 24 and 26. With one side of the section 22 down and the other being elevated, it is necessary that the fence elements 60, 61, 62 and 63 be extended and since the material from which the fence is made is not ordinarily extensible, the springs 58 serve this purpose. Then, after one side of the section 22 is elevated and held in the elevated position by tightening the setscrews, the farmer or other person having need for such a fence, crosses the stream 12 and adjusts the other side of the section 22. The lowering of section 22 is done equally as easily.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is at follows:

1. In a fence, a fence section comprising a pair of spaced rails, supports slidable in said rails, means on said rails for holding said supports in selected, adjusted position with respect to said rails, and fence elements extending between said supports in order to be elevated and lowered with the supports with which they are connected.

2. In a fence, a fence section comprising a pair of spaced rails, supports slidable in said rails, means on said rails for holding said supports in selected, adjusted position with respect to said rails, fence elements extending between said supports in order to be elevated and lowered with the supports with which they are connected, said fence elements comprising wires, and extensible means connecting said wires to said supports.

3. The fence section of claim 2 wherein said extensible means comprise at least one spring for each wire.

4. The adjustable fence section of claim 3 and an apertured guide intermediate the ends of said wires and having said wires threaded therethrough in order to hold said wires spaced from each other before, during and after adjustment of the fence section.

5. In a fence section which is adjustable to be raised and lowered when high water necessitates, said adjustable fence section comprising a pair of spaced inwardly opening rails with vertical passageways, supports slidably disposed in said inwardly opening rails and each support having a part which passes through its passageway, fence elements extending across said supports, means attaching said fence elements to the parts of said supports which pass through said passageways, and means carried by said rails engageable with said supports to hold said supports in adjusted positions so that when said supports are vertically adjusted they may be held in the adjusted position merely by relocating said fence elements.

6. In a fence section which is adjustable to be raised and lowered when high water necessitates, said adjustable fence section comprising a pair of spaced inwardly opening rails with vertical passageways, supports slidably disposed in said inwardly opening rails and each support having a part which passes through its passageway, fence elements extending across said supports, resilient means attaching said fence elements to the parts of said supports which pass through said passageways, means carried by said rails engageable with said supports to hold said supports in adjusted positions so that when said supports are vertically adjusted they may be held in the adjusted position merely by relocating said fence elements, said rails being generally U-shaped in cross-section and having inwardly directed flanges which constitute the side edges of said passageway, and said supports being generally T-shaped in section with one plate thereof being in its rail and the other part thereof passing through its passageway.

7. The section of claim 6 wherein said resilient means comprises a spring at each end of each fence element.

8. In a fence construction, an adjustable fence section comprising a plurality of transverse fence elements, means at each end of said fence elements for independently vertically adjusting each end of said fence elements, said adjusting means comprising a support at each end of said fence elements, rails in which said supports are movably mounted, and means connected to said rails for anchoring said rails in an upright position.

9. The section of claim 8 wherein there are means carried by said rails and in contact with said supports to lock said supports in selected, adjusted positions.

10. In combination, a fence section for straddling a stream of water subject to periodic changes in level, said section including a pair of spaced inwardly opening rails with vertical passageways, supports slidably disposed in said inwardly opening rails and each support having a part which passes through its passageway, fence elements extending across said supports, means attaching said fence elements to the parts of said supports which pass through said passageways, means carried by said rails engageable with said supports to hold said supports in adjusted positions so that when said supports are vertically adjusted they may be held in the adjusted position by relocating said fence elements, said rails being generally U-shaped in cross-section and having inwardly directed flanges which constitute the side edges of said passageway, and said supports being generally T-shaped in section with one plate thereof being in its rail and the other part thereof passing through its passageway.

References Cited in the file of this patent

UNITED STATES PATENTS

| | | |
|---|---|---|
| 634,442 | Cloud | Oct. 10, 1899 |
| 866,695 | Taussig | Sept. 24, 1907 |
| 965,112 | Kemper | July 19, 1910 |
| 1,487,106 | Kelly | Mar. 18, 1924 |
| 1,539,849 | Knutson | June 2, 1925 |
| 1,639,158 | Alberts | Aug. 16, 1927 |